US012799997B2

(12) United States Patent
Savage et al.

(10) Patent No.: US 12,799,997 B2
(45) Date of Patent: Nov. 17, 2026

(54) BRAKE PAD UNIT AND A METHOD OF MANUFACTURE OF A BRAKE PAD UNIT

(71) Applicant: TRIBOL BRAKING LIMITED, Dawlish (GB)

(72) Inventors: Luke Savage, Dawlish (GB); Zoltan Gombos, Bourne End (GB)

(73) Assignee: TRIBOL BRAKING LIMITED, Dawlish (GB)

( * ) Notice: Subject to any disclaimer, the term of this patent is extended or adjusted under 35 U.S.C. 154(b) by 397 days.

(21) Appl. No.: 18/573,768

(22) PCT Filed: Jun. 29, 2022

(86) PCT No.: PCT/GB2022/051677
§ 371 (c)(1),
(2) Date: Dec. 22, 2023

(87) PCT Pub. No.: WO2023/275550
PCT Pub. Date: Jan. 5, 2023

(65) Prior Publication Data

US 2024/0288042 A1 Aug. 29, 2024

(30) Foreign Application Priority Data

Jul. 2, 2021 (GB) ...................................... 2109621

(51) Int. Cl.
*F16D 69/02* (2006.01)
*F16D 65/092* (2006.01)
*F16D 69/04* (2006.01)

(52) U.S. Cl.
CPC ......... *F16D 65/092* (2013.01); *F16D 69/026* (2013.01); *F16D 69/0408* (2013.01);
(Continued)

(58) Field of Classification Search
CPC .... F16D 69/00–2069/0491; F16D 2200/0086; F16D 2200/0091
See application file for complete search history.

(56) References Cited

U.S. PATENT DOCUMENTS 4,173,681 A * 11/1979 Durrieu ................ F16D 69/026 428/404
5,984,055 A 11/1999 Strasser et al.
(Continued)

FOREIGN PATENT DOCUMENTS

GB 2003088 A 1/1982
GB 2071795 A 5/1984
(Continued)

OTHER PUBLICATIONS

Combined Search and Examination Report under Sections 17 and 18(3) for GB2109621.9, issued on Nov. 26, 2021, by the UK International Property Office (7 pages).
(Continued)

*Primary Examiner* — David R Morris
(74) *Attorney, Agent, or Firm* — Alley IP

(57) ABSTRACT

A brake pad unit for a disc brake assembly. The brake pad unit comprises a backing plate and a friction pad. The backing plate comprises a first side and a second side having a length L, a width W, and an edge wall which defines a thickness T of the backing plate. The first side defines an engagement surface for engaging with the disc brake assembly. The second side defines a friction material mounting surface. The backing plate is formed from a composite material comprising reinforcement fibres, wherein the composite material extends throughout of the backing plate. The backing plate comprises a layer of reinforcement fibres which are provided as continuous fibres which extend from a first point on the edge wall to a second point on the edge
(Continued)

wall. The friction pad comprises a friction material provided on the friction material mounting surface of the backing plate.

20 Claims, 9 Drawing Sheets

(52) U.S. Cl.
CPC ................ *F16D 2200/0086* (2013.01); *F16D 2200/0091* (2013.01)

(56) References Cited

U.S. PATENT DOCUMENTS

| | | | | |
|---|---|---|---|---|
| 2001/0051258 | A1* | 12/2001 | Hanzawa | C04B 35/80 428/294.1 |
| 2002/0084558 | A1* | 7/2002 | Hanzawa | C04B 35/573 266/236 |
| 2015/0275990 | A1* | 10/2015 | Inokuchi | F16D 69/02 188/251 A |
| 2017/0138424 | A1* | 5/2017 | Maestrini | F16D 65/0971 |
| 2025/0224010 | A1* | 7/2025 | Savage | B29C 70/46 |

FOREIGN PATENT DOCUMENTS

| | | | | |
|---|---|---|---|---|
| JP | 2015121299 | A | * | 7/2015 |
| JP | 2015121299 | B | | 11/2017 |
| WO | 2015173768 | A1 | | 11/2015 |

OTHER PUBLICATIONS

Examination Report under Section 18(3) for GB2109621.9, issued Mar. 9, 2023, by the UK Intellectual Property Office (4 pages).
International Search Report and Written Opinion in PCT/GB2022/051677, issued on Oct. 17, 2022, by the European Patent Office as International Searching Authority (14 pages).

* cited by examiner

BRAKE PAD UNIT AND A METHOD OF MANUFACTURE OF A BRAKE PAD UNIT

CROSS-REFERENCE TO RELATED APPLICATIONS

This Application is a U.S. National Phase Entry under 35 U.S.C. § 371 of and claims priority to International App. No. PCT/GB2022/051677, filed Jun. 29, 2022, entitled BRAKE PAD UNIT AND A METHOD OF MANUFACTURE OF A BRAKE PAD UNIT, which claims priority to GB 2109621.9, filed Jul. 2, 2021, the entirety of both of which is incorporated herein by reference.

The present disclosure relates to a brake pad unit.

In particular the disclosure is concerned with a brake pad unit for a disc brake assembly, the brake pad unit comprising a backing plate and a friction pad.

BACKGROUND

Conventional automotive brake pads consist of a friction material bonded to a mild steel backing plate. Various innovations have been made to reduce the weight of the brake pad by altering the design of the steel backing plate, for example using a hollow metallic structure filled with polymeric matrix composite material. Others comprise a non-compressible core material which is sandwiched between two sheet metal stampings. Further examples include a metal reinforcing material embedded in thermosetting resin.

A problem with these solutions is that while reducing the extent of the metal reinforcement helps to reduce weight, doing so reduces the strength of the brake pad and increases the chance of the backing plate warping. This may result in the friction material being fractured, which reduces braking ability. Alternatively, this may result in the brake pad getting stuck in the disc brake assembly it is used with, which complicates maintenance. Additionally, because metal parts are used in the described methods, corrosion and catalytic reaction are an issue. For example, corrosion and/or catalytic reactions may degrade the brake pad units that include metal parts.

Hence a brake pad unit which significantly reduces the weight of the brake backing plate but also solves the warping, bending, corrosion and catalytic reaction issues, encountered by examples of the related art, is highly desirable.

SUMMARY

According to the present disclosure there is provided an apparatus and method as set forth in the appended claims. Other features of the invention will be apparent from the dependent claims, and the description which follows.

Accordingly there may be provided a brake pad unit (100) for a disc brake assembly. The brake pad unit (100) may comprise a backing plate (200) and a friction pad (300), wherein: the backing plate (200) comprises: a first side (202) and a second side (204); wherein the first side (202) defines an engagement surface (208) for engaging with the disc brake assembly; the second side (204) defines a friction material (302) mounting surface (210); and the backing plate (200) is formed from a composite material (214) comprising reinforcement fibres (212). The fibres may extend throughout the entirety of the composite material (214). The backing plate (200) may comprise a layer (240, 250) of continuous reinforcement fibres (212). The friction pad (300) may comprise a friction material (302) provided on the friction material (302) mounting surface (210) of the backing plate (200).

All of the fibres in the continuous reinforcement fibre layer (240) may be aligned in the same direction.

At least some of the fibres (212) in the continuous reinforcement fibre layer (250) may extend in a first direction and the remainder of the fibres in the continuous reinforcement fibre layer (250) may extend in a second direction, where the first direction is perpendicular to the second direction.

The backing plate may have a length L, a width W, and a thickness T; and the first direction is the Length direction L, and the second direction is the Width direction W.

In the backing plate (200), at least some of the fibres (212) in the continuous reinforcement fibre layer (250) may extend in a first direction and the remainder of the fibres in the continuous reinforcement fibre layer (250) may extend in a second direction, where the first direction is at an angle less than 90 degrees relative to the second direction.

The fibres (212) extending in the first direction may be provided in a first layer and the fibres extending in the second direction may be provided in a second layer, wherein the first layer and second layer are integrally formed.

The fibres (212) extending in the first direction and the fibres extending in the second direction may be woven together.

The backing plate (200) may further comprise a layer (230) of reinforcement fibres (212) provided in a randomly oriented fibre lay-up pattern.

The randomly orientated reinforcement fibres (212) may have a length of at least 12 mm but not more than 50 mm.

A continuous reinforcement fibre layer (240, 250) may define the engagement surface (208) and/or the friction material (302) mounting surface (210). The continuous reinforcement fibre layer (240, 250) may be integrally formed with the or each other layers (230, 240, 250) of the backing plate (200).

The composite material (214) of the backing plate (200) and the composite material (314) of the friction material (302) may further comprise a binder material (400). The binder material of the backing plate (200) may have molecular continuity with the binder of the friction material (302) to thereby form a bond between the backing plate (200) and the friction material (302).

The backing plate (200) and friction material (302) may be co-moulded from an assembly of a backing plate (200) pre-cursor and friction pad (300) pre-cursor.

The composite material (214) of the backing plate (200) may further comprise a first binder material (410); the composite material (314) of the friction material (302) may further comprise a second binder material (420), the first binder material (410) being different to the second binder material (420); and the friction material (302) being bonded to the friction material mounting surface (210) of the backing plate (200).

The reinforcement fibre (212) may comprise at least one of glass S-glass E-glass, carbon, aramid, other types of mineral fibre (e.g. borosilicate).

The binder (400, 410, 420) may comprise filled or unfilled phenolic novolac or resol type resins, epoxy, polyesters, polyimide, BMI and/or any of the PAEK family of thermoplastics.

The fibres (112) may be arranged such that the flexural modulus of the backing plate (200) is at least 24 GPa. The fibres (112) may be arranged such that the flexural modulus of the backing plate (200) is at least 250 MPa.

The fibres (112) may be arranged such that the backing plate (200) has a compressive strength such that it is operable to deflect less than 0.7 mm at a load of 3000 N up to 250 degC.

The backing plate (200) may have a thickness of at least 2 mm but no more than 10 mm.

In the backing plate (200), the continuous reinforcement fibre layer (250) may comprise: a first set of the reinforcement fibres (212) extending in a first direction; a second set of the reinforcement fibres (212) extending in a second direction different to the first direction; and one or more other sets of the reinforcement fibres (212) extending in respective directions different to the first direction and the second direction.

There may also be provided a method of manufacture of a brake pad unit (100) for a disc brake assembly comprising: forming a composite backing plate (200) pre-cursor formed from a composite material (214) comprising reinforcement fibres (212), wherein fibres extend throughout the entirety of the composite material (214); and wherein the backing plate (200) pre-cursor comprises a layer (240, 250) of continuous reinforcement fibres (212), and forming a friction pad (300) pre-cursor from a friction material (302).

The method of manufacture may further comprise the step of co-moulding the pre-cursors to form the brake pad unit (100).

The method of manufacture may further comprise the steps of: arranging the precursors in a mould tool; locating the mould tool in a heated press set at a temperature high enough to induce flow in the binder; compressing the arranged precursors to provide flow of the binder and compaction of the moulding such that the pre-cursors are co-moulded; subjecting the arrangement to a post-curing heating profile.

The post curing profile may comprise a schedule of repeatedly increasing the temperature and holding the condition at the higher temperature for a predetermined amount of time.

The method of manufacture may comprise the steps of: forming a composite backing plate (200) from the composite backing plate pre-cursor; forming a friction pad (300) from the friction pad (300) pre-cursor; bonding the composite backing plate (200) and friction pad (300) to form the brake pad unit (100).

The method of manufacture may comprise the steps of: forming a composite backing plate (200) from the composite backing plate pre-cursor; and forming a friction pad (300) by moulding the friction pad (300) pre-cursor onto the composite backing plate (200).

Hence there is provided a brake pad unit 100 for a disc brake assembly with a configuration which means it may be produced to have a weight which is less, and stiffness which is at least as high as, examples of the related art. A brake pad unit according to the present disclosure is inherently non-metallic and thereby highly corrosion resistant, with therefore negligible emissions of corrosion products into the environment. The non-metallic brake pad unit is also resistant to catalytic reaction.

BRIEF DESCRIPTION OF THE DRAWINGS

Examples of the present disclosure will now be described with reference to the accompanying drawings, in which.

DETAILED DESCRIPTION

The present disclosure relates to a brake pad unit 100. A brake pad unit 100 according to the present disclosure may, in use, form part of a disc brake assembly for use, for example, on an automobile or other vehicle. The brake pad unit 100 comprises a backing plate 200 and a friction pad 300. The details of the disc brake assembly are not required to understand the features of the brake pad unit 100, and hence is not described.

The brake pad unit 100 may be retrofittable to existing disc brake assemblies, and be used with conventional disc brake assembly designs, including, but not limited to, regenerative brake systems. Hence the brake pad unit may be assembled together with other common features of disc brake assemblies, for example wear sensors to monitor the remaining lifetime of the unit.

The brake pad unit 100 of the present disclosure provides a solution configured to significantly reduce the weight of the brake backing plate 200 as well as reducing the likelihood of warping and bending of the brake pad unit 100. In addition, since a brake pad unit according to the present disclosure is inherently non-metallic, it provides a corrosion-free solution, reducing maintenance and requiring less frequent replacement than examples of the related art. This is of particular relevance to electric vehicles that employ regenerative braking systems. This is because duty cycles of brakes of electric vehicles are markedly reduced, and hence operational life significantly extended, compared to conventional "foundation" braking systems, and hence brake pad unit replacement may be far less frequent. The absence of metallic material in a backing plate of the present disclosure therefore means it will not corrode, regardless of how long it is in place in the braking system. As will be described, the brake pad unit 100 of the present disclosure utilises a polymer composite comprising a fibre reinforced polymer resin binder. Those skilled in the art will appreciate that a composite material is formed by combining two or more different materials, each with its own characteristic properties. Combining the two or more different materials results in a composite material, which may have improved properties for certain applications. As referred to herein, references to a composite backing plate, backing plate formed from a composite material, and the like relate to a backing plate made from a composite material formed by combining two or more different material. For example, a backing plate made of steel only is not a composite backing plate. Steel is an alloy and not a composite material, as those skilled in the art will appreciate. In the examples described herein a multi-material solid polymer composite is used for the backing plate, which consists of non-metallic fibres and non-metallic polymer matrices (e.g., comprising non-metallic resin(s) and/or acting as binder(s)).

Figure 1:
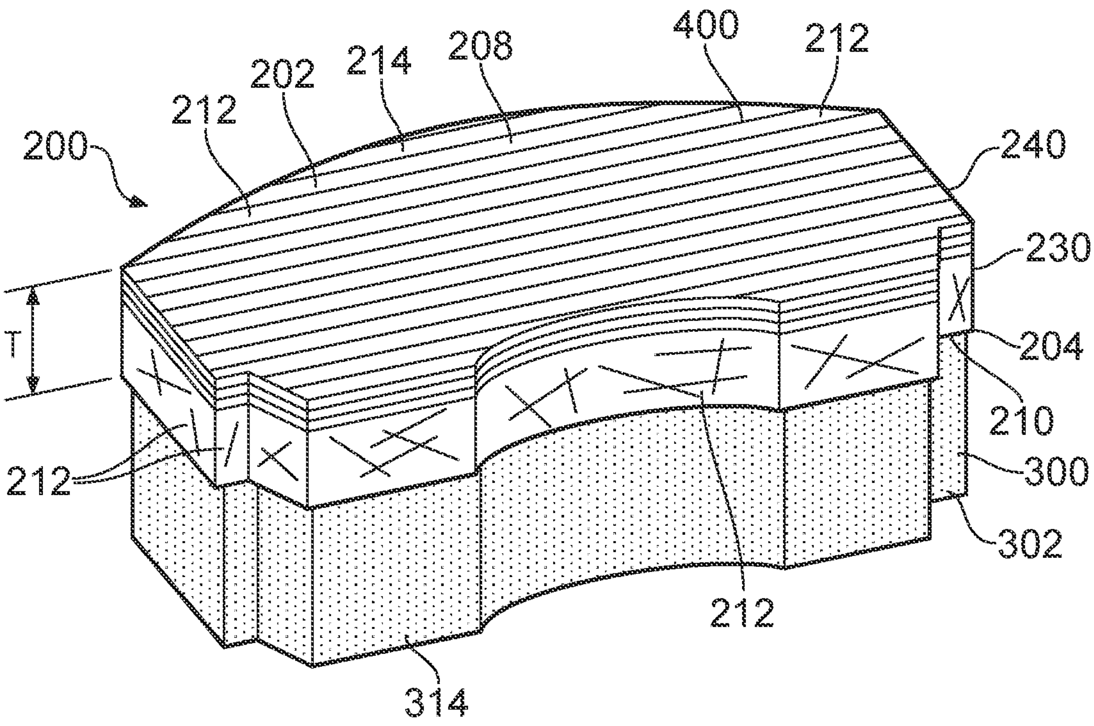
FIG. 1 shows a first example of a brake pad unit according to the present disclosure.
Figure 2:
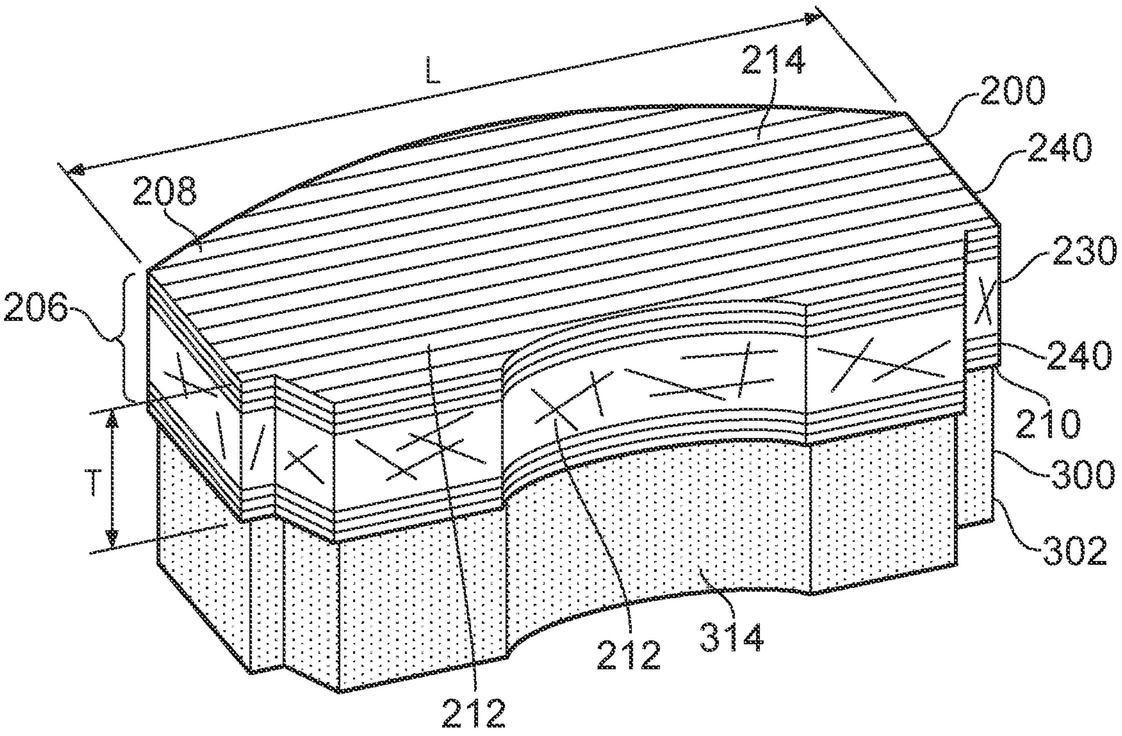
FIG. 2 shows a second example of a brake pad unit according to the present disclosure.
Figure 13:
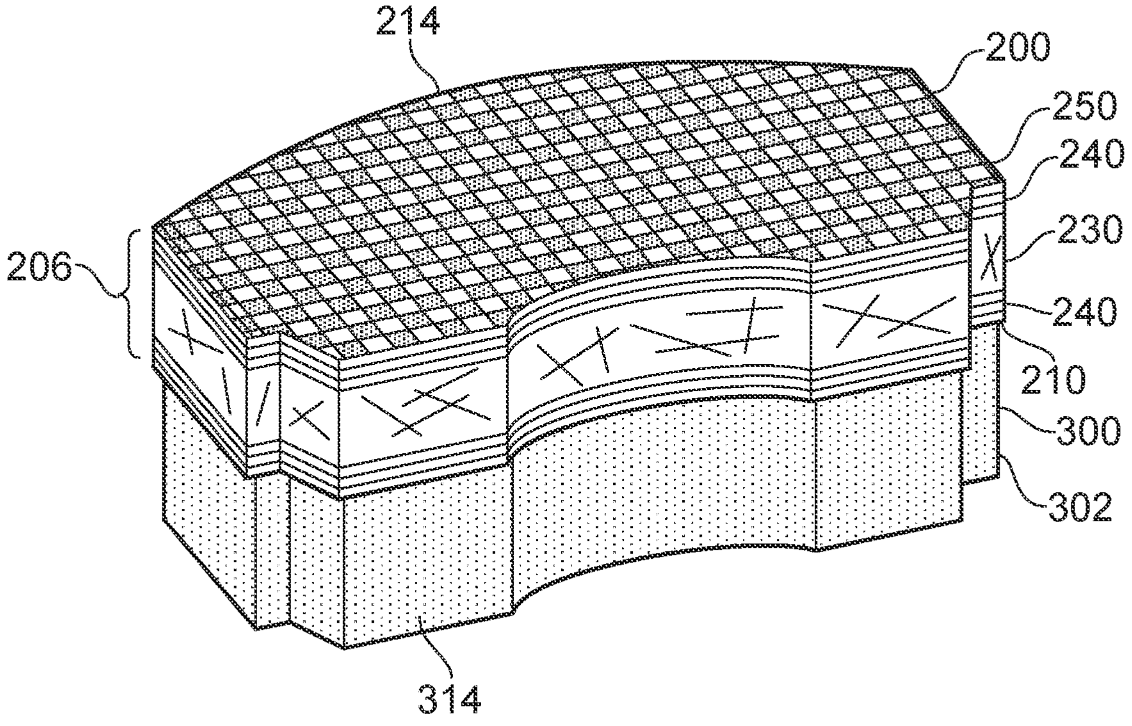
FIG. 13 shows a third example of a brake pad unit according to the present disclosure.

FIG. 1 shows a first example of a brake pad unit 100 according to the present disclosure. FIG. 2 shows a second example of a brake pad unit 100 according to the present disclosure. FIG. 13 shows a third example of a brake pad unit 100 according to the present disclosure.

As shown, the backing plate 200 may be flat (i.e. in planar, extending in a flat plane). The backing plate 200 may comprise a first side 202 and a second side 204 such that the first side 202 and second side 204 provide surfaces on opposite sides of the backing plate 200. As shown in FIGS. 2, 4 to 6, 7 to 9, 10 to 12 the sides 202, 204 have a nominal length L and a nominal width W. The sides 202, 204 may have the same nominal length L and nominal width W. Hence the backing plate 200 may have a nominal length L and a nominal width W. An edge wall 206 (which may comprise several layers, for example as shown in FIGS. 1, 2, 13) extends between the sides 202, 204, and the edge wall 206 defines a thickness T of the backing plate 200. As shown, the backing plate 200 may have uniform thickness. Hence the edge wall 206 may extend the full thickness T of the backing plate 200.

As shown in the figures, the Length L and Width W refer to the dimensions of the backing plate layers which relate to attributes that can reasonably be thought of as Length and Width. For example, Length L is between the limits defined by the edge wall 206 at opposite ends of the backing plate, and Width W is a dimension perpendicular to the Length L between opposing sides of the edge wall 206.

As shown in FIG. 1, the first side 202 defines an engagement surface 208 for engaging with the disc brake assembly. That is to say, the engagement surface 208 defines a free side of the backing plate 200 which, in use, may locate against a part of the disc brake system to which it is fitted. The second side 204 defines a friction material mounting surface 210. Hence the friction pad 300 is provided on the friction material mounting surface 210.

The backing plate 200 may be a polymer composite backing plate. The backing plate 200 may comprise reinforcement fibres 212 and a polymer matrix, for example. For example, the backing plate 200 may comprise a polymer matrix which comprises a resin and/or a polymer matrix which acts as a binder. Some of the examples described herein are in the context of the polymer matrix being a binder, however, the polymer matrix may be any kind of polymer matrix described herein.

For example, the backing plate 200 is formed from a composite material 214 comprising reinforcement fibres 212, wherein the composite material 214 extends throughout the whole of the backing plate 200. In other words, the backing plate 200 is formed from a composite material 214 comprising reinforcement fibres 212, wherein the composite material 214 is present throughout the entirety of the backing plate 200. That is to say, the composite material 214 comprising the reinforcement fibres 212 extends the length and the width of the backing plate 200. Put another way, composite material 214 (comprising the reinforcement fibres) is present throughout the whole of the volume of material which forms the backing plate 200. Put another way, the composite material 214 comprising the reinforcement fibres 212 is present throughout the entirety of the backing plate 200. In other words, there is no region of the backing plate that is devoid of the composite material 214. The backing plate 200 may comprise only the reinforcement fibres 212 and a polymer matrix (e.g., comprising a resin and/or acting as a binder material). For example, the backing plate 200 may only comprise the composite material 214 comprising the reinforcement fibres 212 and a binder material. That is to say, the backing plate (and hence brake pad) may not include any further materials, for example metallic elements. That is to say, the backing plate (and hence brake pad) may consist of only non-metallic materials.

The backing plate 200 may comprise one or more layers of reinforcement fibres 212 and a binder material, each with a thickness T-layer, where the sum of the thickness of the layer or layers equals the thickness T of the backing plate 200. In examples with more than one layer, the layers may comprise the reinforcement fibres 212 provided in different structures, as described below. For example, as discussed below, the backing plate may comprise a layer 230 of reinforcement fibres 212 provided in a randomly oriented fibre lay-up pattern. For example, as discussed below, the backing plate 200 may comprise a layer 240, 250 of reinforcement fibres 212 which are provided as continuous fibres.

In the figures the fibres 212 are represented as spaced apart lines, which is purely diagrammatic to represent the different forms/lay ups of the fibres in each layer.

The fibres may be provided in bundle/tow form.

The friction pad 300 comprises a friction material 302. The friction pad 300 is provided on the friction material mounting surface 210 of the backing plate 200. The friction material 302 may be formed from a composite material 314 comprising a particulate powder.

Figure 5:
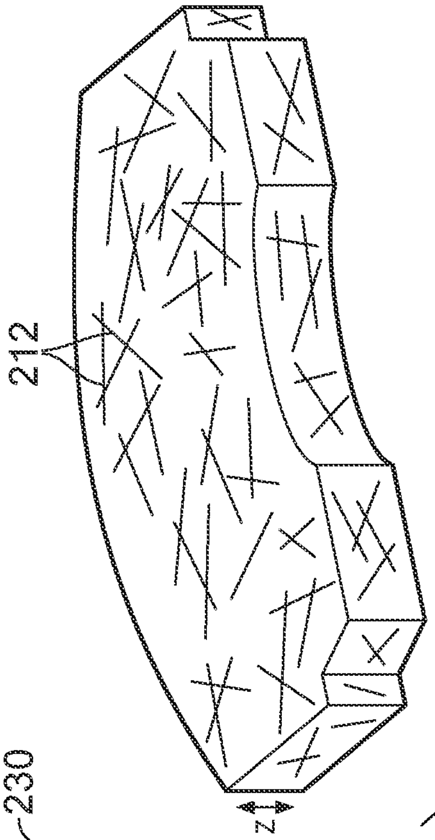
FIGS. 5, 6 show different thickness examples of the backing plate layer of FIG. 4.
Figure 6:
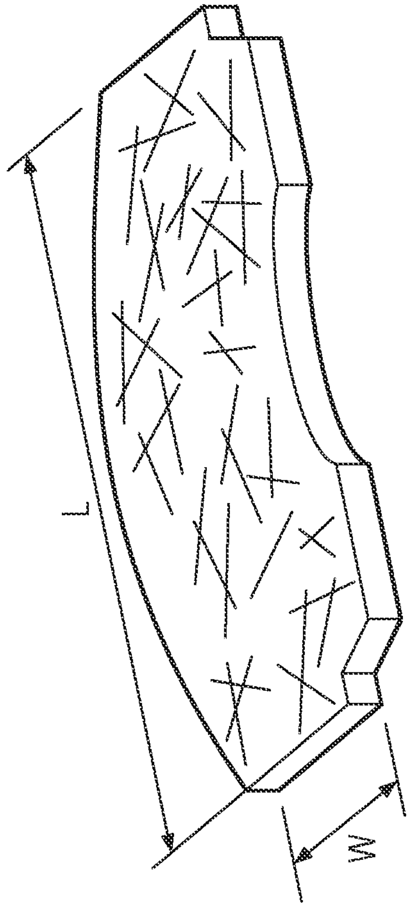

As shown in FIGS. 1, 2, 3, 13 the backing plate 200 may comprise a layer 230 of reinforcement fibres 212 provided in a randomly oriented fibre lay-up pattern. An example of this randomly oriented fibre layer 230 is shown in FIGS. 4 to 6. In such an arrangement, the reinforcement fibres 212 may have a length of at least 12 mm but not more than 50 mm. In one example, the fibres extend less than the length L of the backing plate and/or extend less than the width W of the backing plate. In another example, the fibres have a length less than the width W of the backing plate.

In some examples, the layer 230 of the randomly oriented reinforcement fibres may be formed using a composite material containing reinforcement fibres which are short enough such that said composite material may be moulded into various different shapes. For example, the fibre may have lengths as described above in relation to the layer 230. Such a composite material may be referred to as a moulding compound, as those skilled in the art will appreciate. The fibres in the moulding compound may be referred to as discontinuous due to their shorter length, as those skilled in the art will appreciate. The moulding compound may also comprise a polymer matrix (e.g., comprising a resin and/or acting as a binder). The layer 230 may be formed by using any means which provide the described structure of the layer 230.

Figure 7:
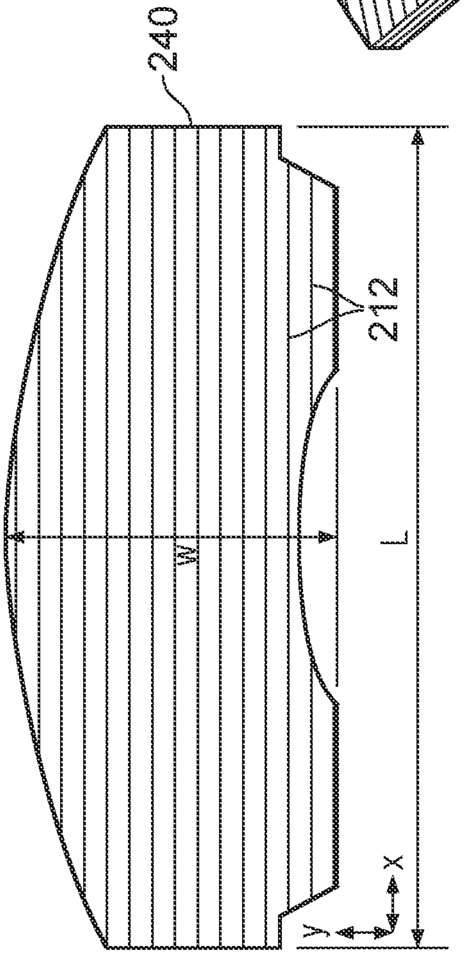
FIG. 7 shows a plan view of a backing plate layer according to the present disclosure comprising unidirectional (UD) continuous fibres.
Figure 8:
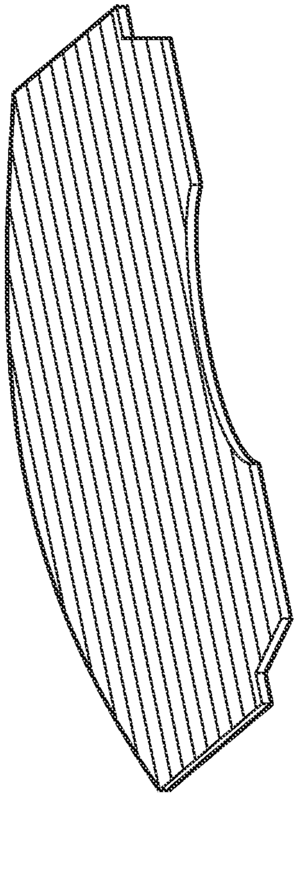
FIG. 8 shows an example of the backing plate layer of FIG. 7, and/or part of a backing plate, which consists of a single layer of unidirectional (UD) continuous fibres.
Figure 9:
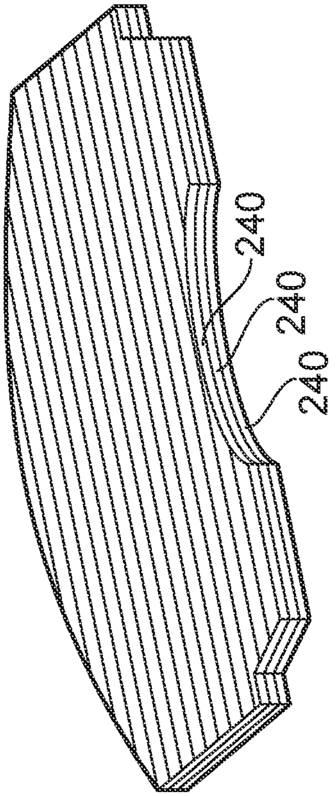
FIG. 9 shows an example of the backing plate layer of FIG. 7, and/or part of a backing plate, which consists of several integrally formed layers of unidirectional (UD) continuous fibres.

The backing plate 200 may comprise a layer of reinforcement fibres 212 which are provided as continuous fibres 212 such that they extend unbroken (i.e., such that they are continuous) from a first location on an edge wall of the backing plate 200 to a second location on the edge wall. In other words, there are no breaks in the continuous fibres between the first location and the second location, for example. As shown in FIGS. 1 to 3, 13 the backing plate 200 may comprise a layer 240 of reinforcement fibres 212 which are provided as continuous fibres which extend from a first point on the edge wall 206 to a second point on the edge wall 206. Put another way, the backing plate 200 comprises a layer of reinforcement fibres 212 which are provided as continuous fibres which each extend through the layer of the backing plate 200, each fibre starting at a location on the edge wall 206 of the layer and finishing at another location on the edge wall of the layer. Examples of this are shown in FIGS. 7 to 9 for a layer 240 and FIGS. 10 to 12 for a layer 250. The continuous fibre layer 250 may also comprise reinforcement fibres 212 which are provided as continuous fibres which extend from a first point on the edge wall 206 to a second point on the edge wall 206, as described in relation to the reinforcement fibre layer 240. In some examples, the continuous fibre layer 240 and/or the continuous fibre layer 250 may be formed using one or more pre-impregnated fibre layers (prepreg). For example, the continuous fibre layer 240 and/or the continuous fibre layer 250 may be a cured prepreg layer. Those skilled in the art will appreciate that pre-impregnated fibre layers may comprise fibres and a partially cured polymer matrix (e.g., comprising a resin and/or acting as a binder) and a pre-impregnated fibre layer is referred to as a B-Stage material. For example, the one or more pre-impregnated fibre layers may be cured during manufacture of the backing plate 200 to provide the continuous fibre layer 240 and/or the continuous fibre layer 250.

In some other examples, the continuous fibre layer 240 and/or the continuous fibre layer 250 may be formed using one or more fabric layers of the reinforcement fibres 212 and by introducing a polymer matrix (e.g., comprising a resin and/or acting as a binder) during manufacture of the backing plate 200. The continuous fibre layer 240 and/or the continuous fibre layer 250 may be provided using any method and/or precursor which provides the described structure including continuous fibres, for example.

Figure 10:
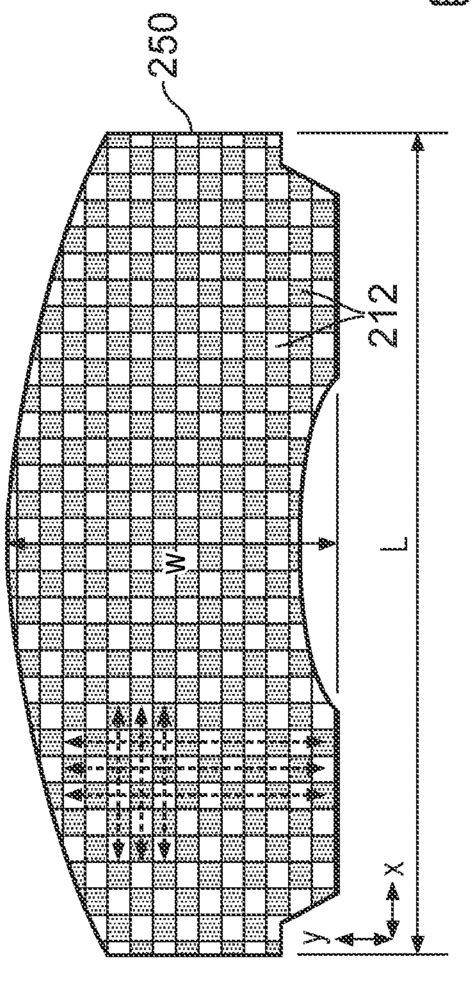
FIG. 10 shows an example of a backing-plate layer made from woven continuous fibres.
Figure 11:
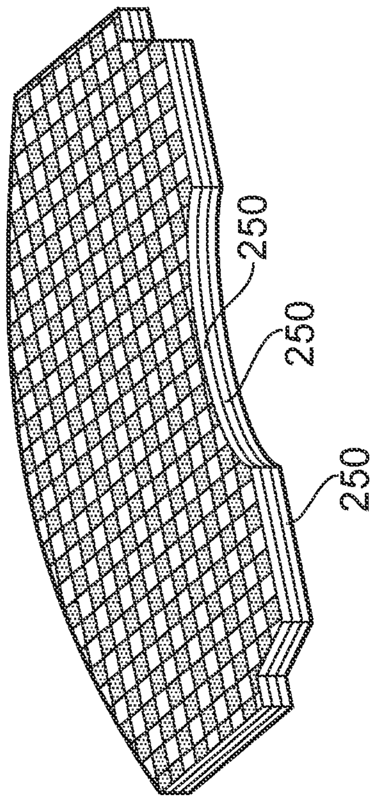
FIG. 11 shows an example of the backing plate layer of FIG. 10, and/or part of a backing plate, which consists of several integrally formed layers of woven continuous fibres.
Figure 12:
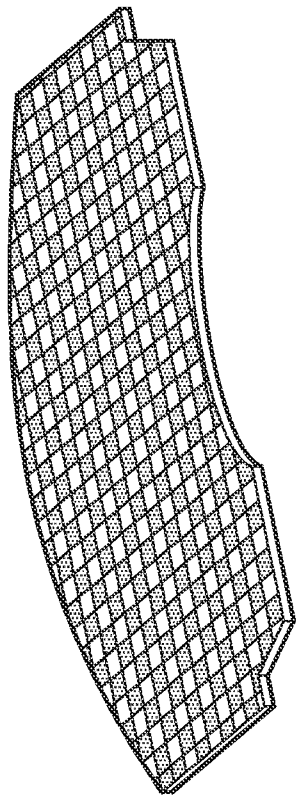
FIG. 12 shows an example of the backing plate layer of FIG. 10, and/or part of a backing plate, which consists of a single layer of woven continuous fibres.

In some examples, as shown in FIGS. 7 to 9, all of the fibres in the layer 240 are aligned in the same direction. The fibres may extend the full length L of the backing plate (i.e. in the x-axis as shown in the example of FIGS. 7 to 9 and as shown in the example of FIGS. 10 to 12) and/or extend the full width W of the layer 250 of the backing plate (i.e. in the y-axis as shown in the example of FIGS. 10 to 12). Put another way, a fibre 212 is continuous if it extends a full distance across the layer of the backing plate (e.g. the full length L or the full width W of the backing plate). Hence although, as shown in the figures, the length L and/or width W of the backing plate differs depending on where the length/width is measured, the fibres "extend the full length L of the backing plate" and/or "extend the full width W of the layer 250 of the backing plate" if they extend in a straight line from one location on the edge wall 206 across the length/width of the layer to terminate at another location on the edge wall.

Fibres 212 may be aligned with the Length L and/or Width W directions (i.e. X axis and/or Y axis respectively), as shown in the examples for layers 240, 250. However, fibres may be provided at an angle to the Length L and/or Width W directions (i.e. X axis and/or Y axis respectively), while still being in the same plane.

In a randomly orientated fibre layer 230 the fibres are provided at different angles to the Length L and Width W directions (i.e. X axis and Y axis respectively), and also may extend in the Z axis (i.e. the thickness T direction).

The backing plate 200 may comprise a layer 250 of woven continuous fibres (for example as shown in FIGS. 10 to 13). That is to say, in such a layer 250 at least some of the fibres 212 extend in a first direction and the remainder of the fibres extend in a second direction. For example, the relative angle between the first direction and the second direction may be between 0 degrees and 90 degrees. In some examples, the first direction is at right angles (i.e. perpendicular) to the second direction. In some examples, the first direction is at an angle less than 90 degrees relative to the second direction. In some examples, the layer 250 of woven continuous fibres may comprise a first set of fibres extending in the first direction, a second set of fibres extending in the second direction, and one or more other sets of fibres extending in respective directions different to the first direction and the second direction.

In one example of such a layer 250, for example as shown in FIGS. 10 to 13, at least some of the fibres 212 extending in the first direction and at least some of the fibres extending in the second direction are woven together. In some examples, the first direction may be the Length direction L, and the second direction may be the Width direction W (as indicated by the dotted arrows aligned in a X axis and Y axis direction respectively). Put another way, the fibres 212 extending in the first direction and the fibres extending in the second direction may be woven together such that the warp and weft of the fibre weave run the length L (along the x-axis) and width W (along the y-axis) of the plate 200.

In other examples, the layers may be stitched (i.e. provided as a Non-Crimp Fabric) and configured with an orientation that is optimised to achieve best performance.

In an alternative example, the fibres 212 extending in the first direction are provided in a first layer 250 and the fibres extending in the second direction are provided in an adjacent layer.

As shown in FIG. 1, the backing plate 200 may comprise a layer 240 of reinforcement fibres 212 in which all of the fibres in the layer 240 are aligned in the same direction (i.e. along the x-axis, as shown in FIGS. 7 to 9) and which defines the engagement surface 208. The backing plate 200 may further comprise a layer 230 in which the fibres 212 are provided in a randomly oriented fibre lay-up pattern 230 (as shown in FIGS. 4 to 6), where the randomly orientated fibre layer 230 defines the friction material 302 mounting surface 210. The layers of the backing plate 200 may be integrally formed. For example, the layers of the backing plate may be co-moulded and hence form a mono-structure in which there is a step change in lay up/arrangement of the fibres from one layer to another.

In some examples, the composite material 214 of the backing plate 200 and the composite material 314 of the friction material 302 further comprise a binder material 400. In such an example, once the brake pad unit has been formed, the binder of the backing plate 200 has molecular continuity with the binder of the friction material 302 to thereby form a bond between the backing plate 200 and the friction material 302. In such an example, the backing plate

200 and friction material 302 may be co-moulded from an assembly of a backing plate 200 pre-cursor (e.g. fibres arranged in the desired orientation) and friction pad 300 pre-cursor (e.g. un-cured friction material, so that when cures a chemical bond is formed) to provide molecular continuity between the layer (or layers) of the backing plate 200 and the friction pad 300. That is to say, in some examples, the composite material 214 of the backing plate 200 and the composite material 314 of the friction material 302 comprise a common or compatible binder material 400 which during the forming process will flow between the backing plate pre-cursor and the friction material pre-cursor and thereby, when cured, provided a bond between the regions of backing plate material and friction material. Hence the binder material extends throughout the brake pad unit, acting to bind the fibres of the backing plate, the friction material of the brake pad, and to bind the backing plate section to the friction pad section.

In further examples, the composite material 214 of the backing plate 200 comprises a first binder material 410 and the composite material 314 of the friction material 302 further comprises a second binder material 420, the first binder material 410 being different to the second binder material 420. In such examples the friction material 302 may be bonded to the friction material mounting surface 210 of the backing plate 200. For example the friction material 302 may be bonded to the friction material mounting surface 210 of the backing plate 200 by an adhesive.

The fibres 212 may be provided with a binder (e.g. a resin) in a pre-impregnated form (i.e. "prepreg").

Figure 3:
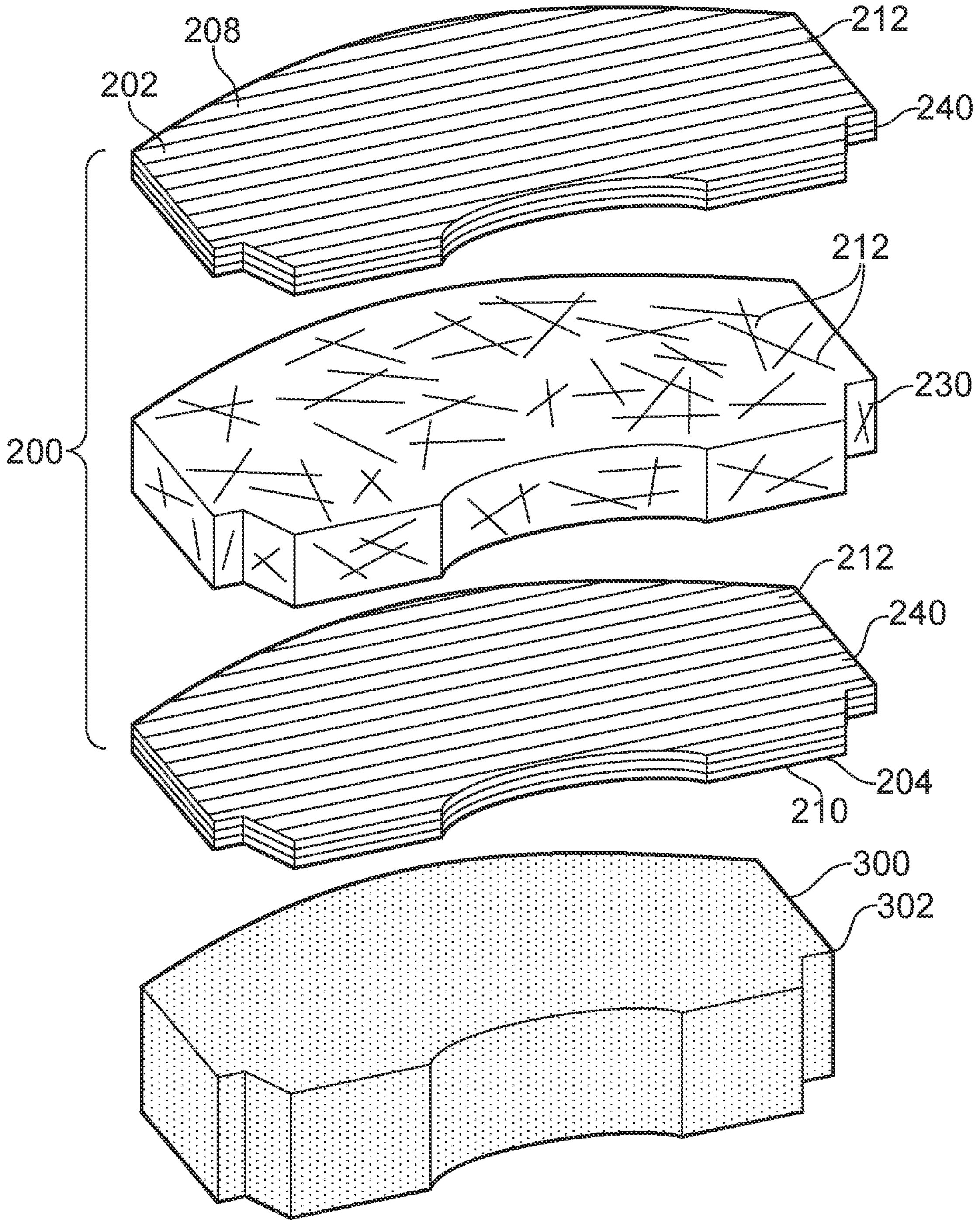
FIG. 3 shows an exploded view of the arrangement in FIG. 2.
Figure 4:
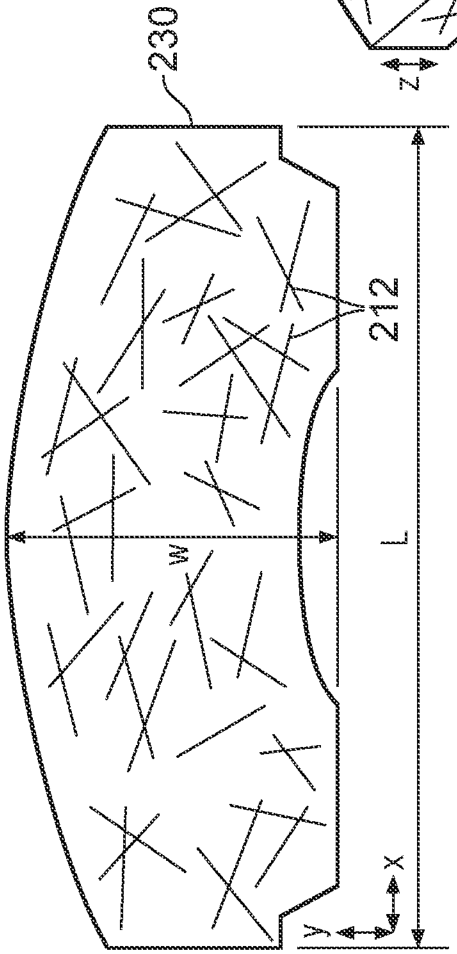
FIG. 4 shows a plan view of a backing plate layer according to the present disclosure in which reinforcement fibres are randomly oriented.

As shown in FIGS. 2, 3 the backing plate 200 may comprise a layer 240 of continuous reinforcement fibres 212 in which all of the fibres in the layer 240 are aligned in the same direction (as shown in FIGS. 7 to 9) and which defines the engagement surface 208. The backing plate 200 may comprise a layer 240 of continuous reinforcement fibres 212 in which all of the fibres in the layer 240 are aligned in the same direction (as shown in FIGS. 7 to 9) and which defines the friction material 302 mounting surface 210. The backing plate 200 may further comprise a layer 230 in which the fibres 212 are provided in a randomly oriented fibre lay-up pattern 230 (as shown in FIGS. 4 to 6), where the randomly orientated fibre layer 230 is sandwiched (ie provided) between the two continuous reinforcement fibres layers 240.

The backing plate 200 may comprise a layer 230 (as shown in FIGS. 4 to 6) of reinforcement fibres 212 provided in a randomly oriented fibre lay-up pattern which defines the engagement surface 208 in addition to a layer 230 of reinforcement fibres 212 provided in a randomly oriented fibre lay-up pattern which defines the friction material 302 mounting surface 210, and a layer 240 in which all of the fibres in the layer 240 are aligned in the same direction (as shown in FIGS. 7 to 9) provided between the engagement surface 208 layer and the friction material 302 mounting surface 210 layer.

Alternatively, instead of the layer 240 in which all of the fibres in the layer 240 are aligned in the same direction (as shown in FIGS. 7 to 9), there may be provided the layer 250 (as shown and described in relation to FIGS. 10 to 12) in which the fibres 212 are woven.

As shown in the example of FIG. 13, the backing plate 200 may comprise, in series:

- a woven layer 250 of continuous reinforcement fibres 212 (as shown in FIGS. 10 to 12) and which defines the engagement surface 208;
- a layer 240 of continuous reinforcement fibres 212 in which all of the fibres in the layer 240 are aligned in the same direction (as shown in FIGS. 7 to 9);
- a layer 230 in which the fibres 212 are provided in a randomly oriented fibre lay-up pattern 230 (as shown in FIGS. 4 to 6); and a layer 240 of continuous reinforcement fibres 212 in which all of the fibres in the layer 240 are aligned in the same direction (as shown in FIGS. 7 to 9) and which defines the friction material 302 mounting surface 210.

Hence the random configuration 230 (for example as shown in FIGS. 4 to 6), continuous configuration (for example as shown in FIGS. 7 to 9) and woven layers (for example as shown in FIGS. 10 to 12) can be combined in any combination which includes at least one of a continuous layer 240 (for example as shown in FIGS. 7 to 9) and/or at least one of a woven layer 250 (for example as shown in FIGS. 10 to 12). Put another way, the backing plate 200 comprises at least a layer 240, 250 of reinforcement fibres 212 which are provided as continuous fibres which extend from a first point on the edge wall 206 to a second point on the edge wall 206.

The layers may be provided in a variety of different thicknesses, dependent on the required mechanical and thermal properties of the backing plate.

In at least some of the examples as herein described, the combination of materials results in a backing plate with a thermal conductivity which is less than 5 W/(m K). In at least some of the examples as herein described, the combination of materials results in a backing plate with a thermal conductivity which is less than 2 W/(m K).

Hence the brake pad unit is configured to reduce heat transfer between the sides of the backing plate 200. Hence, in use, when the brake pad unit 100 is installed in a disc brake assembly, it will insulate the disc brake assembly from heat generated on the friction pad 300. Hence a brake pad unit according to the present disclosure will thermally insulate brake pistons, brake fluid and other elements of the disc brake assembly more than brake pad units of the related art. For brake pad units of the related art comprising a metallic material may readily conduct heat to the disc brake assembly.

The backing plate 200 may have a thickness of at least 2 mm. The backing plate may have a thickness of no more than 10 mm. The backing plate may have a thickness of no more than 15 mm. The backing plate may have a thickness of no more than 25 mm.

Any one of the examples using the fibre arrangements as herein described, with a backing plate thickness of at least 2 mm, but without needing to exceed a backing plate thickness of 10 mm, 15 mm or 25 mm, may provide a backing plate 200 with a flexural modulus of at least 24 GPa. Put another way, a backing plate 200 according to the present disclosure may be configured to have a flexural modulus of at least 24 GPa. A backing plate 200 according to the present disclosure may be configured to have a flexural modulus of at least 40 GPa. A backing plate 200 according to the present disclosure may be configured to have a flexural modulus of not more than 200 GPa.

Any one of the example backing plate structures configured according to the fibre arrangements as herein described may exhibit no more than a 15% drop flexural modulus (Ef) between room temperature performance and at 130° C. performance (for example following ISO14125 standard flexural test method and and/or less than 15% drop of storage modulus at the same conditions following DMA test according to ISO 6721 standard). Put another way, a backing plate 200 according to the present disclosure may be configured to exhibit no more than a 15% drop flexural modulus (Ef) between room temperature performance and at 130° C. performance (for example following Iso-standard flexural 14125 test method and DMA test according to ISO 6721 standard).

Any one of the examples using the fibre arrangements as herein described, with a backing plate thickness of at least 2 mm, but without needing to exceed a backing plate thickness of 10 mm, 15 mm or 25 mm, may provide a backing plate 200 with a flexural strength of at least 250 MPa. Put another way, a backing plate 200 according to the present disclosure may be configured to have a flexural strength of at least 250 MPa. A backing plate 200 according to the present disclosure may be configured to have a flexural strength of at least 450 MPa. A backing plate 200 according to the present disclosure may be configured to have a flexural strength of not more than 1 GPa.

Any one of the examples using the fibre arrangements as herein described, with a backing plate thickness of at least 2 mm, but without needing to exceed a backing plate thickness of 10 mm, 15 mm or 25 mm, may provide a backing plate 200 with a compressive strength such that it is operable to deflect less than 0.7 mm at a load of 3000 N up to 250 degC. Put another way, a backing plate 200 according to the present disclosure may be configured to deflect less than 0.7 mm at a load of 3000 N up to 250 degC. In some examples, the fibres 212 are arranged such that the backing plate 200 has a compressive strength such that it is operable to deflect less than 5%, and preferably less than 2%, at a representative load equivalent to maximum braking, in use, up to 250 degC.

In some examples, the fibres 212 may be arranged to provide compressive strength such that the brake pad unit 100 (including the friction pad 300 and the back plate 200) has a compressive strength such that it is operable to deflect less than 0.7 mm at a load of 3000 N up to 250 degC.

Any one of the examples using the fibre arrangements as herein described, with a backing plate thickness of at least 2 mm, but without needing to exceed a backing plate thickness of 10 mm, 15 mm or 25 mm, may provide a backing plate 200 with a compressive strength such that it is operable to deflect less than 5% at a pressure of up to 80 bar up to 250 degC. Put another way, a backing plate 200 according to the present disclosure may be configured to deflect less than 5% (e.g. 0.7 mm) at a pressure of 80 bar at temperature up to 250 degC.

Any one of examples of backing plates 200 using the fibre arrangements as herein described would retain its integrity during a pad shear test (tested via ISO 6312:2010 standard) at a minimum 362 psi (2.5 MPa) shear strength at room temperature.

Experiments have shown that any one of the examples using the fibre arrangements as herein described would achieve over 1200 psi (8.3 MPa) shear strength values.

As shown in FIG. 9, the backing plate 200 may comprise several layers 240 of fibres provided in the same orientation, where the layers are integrally formed.

As shown in FIG. 11, the backing plate 200 may comprise several layers 250 of woven fibres, where the layers are integrally formed.

The reinforcement fibre 212 may comprise at least one of glass S-glass E-glass, carbon, aramid, other types of mineral fibre (e.g. borosilicate).

The binder 400, 410, 420 (e.g. for the backing plate and/or friction material) may comprise filled or unfilled phenolic novolac or resol type resins, epoxy, polyesters, polyimide, BMI and/or any of the PAEK family of thermoplastics.

The friction pad 300 may comprise phenolic resins as a binder, including so-called organic, metallic, ceramic and any sintered metal type.

In all cases, at least some of the layers are integrally formed. That is to say, there is molecular continuity between at least some of the layers of the backing plate.

The layers of the backing plate and/or the backing plate and friction material may be formed as part of a single process such that, while the properties of one layer may differ to an adjacent or other layer in the structure, the layers form a unitary structure (i.e. a mono-structure). Hence molecules which define a region between adjacent layers form a continuous structure with both layers. That is to say, there is no join between the integrally formed (molecularly continuous) layers. Put another way, the mono-structure of the present disclosure may be defined as a unitary structure with regions (herein described as sections, volumes and/or layers) having different characteristic mechanical properties.

The layers of the backing pate 200 are made of the same material in so far as the constituent parts of the backing plate material of the different layers are the same, although the constituent parts may be present in different concentrations in some layers compared to other layers to thereby introduce differences in the properties (for example characteristic mechanical property) of the layers.

Figure 14:
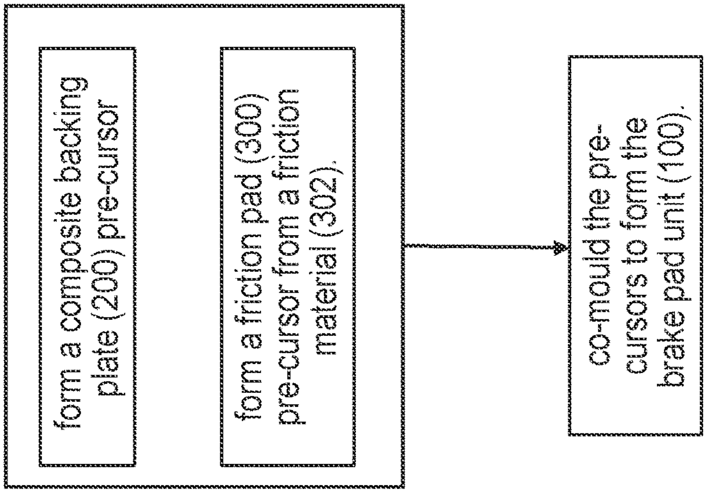
FIG. 14 illustrates a first example of a method of manufacture.

FIG. 14 illustrates a first method of manufacture of a brake pad unit 100 as herein described for a disc brake assembly, comprising the steps of:

a. forming a composite backing plate 200 pre-cursor, which comprises fibres 212 and a binder;
b. forming a friction pad 300 pre-cursor from a friction material 302 and the binder;
c. co-moulding the pre-cursors to form the brake pad unit 100.

The method may further comprise the step of arranging the precursors in a mould tool, and locating the mould tool in a heated press set at a temperature high enough to induce flow in the binder. The method may comprise the step of compressing the arranged pre-cursors with a suitable force to provide adequate flow of the binder throughout the pre-cursors and to compact the moulding (and hence the pre-cursors).

Figure 15:
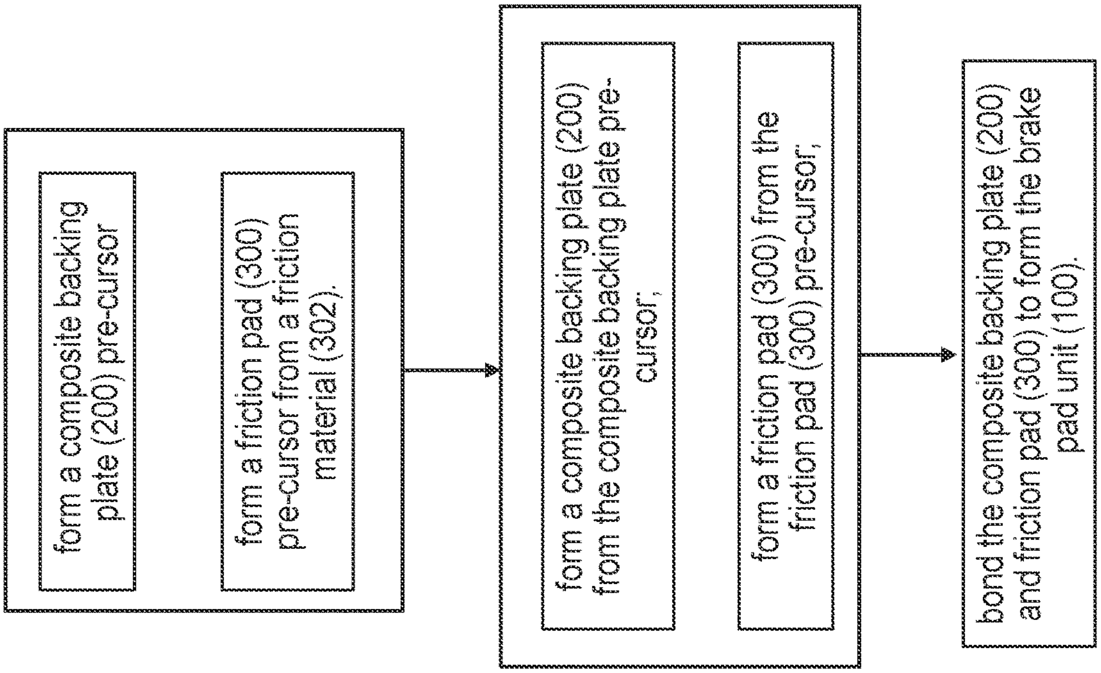
FIG. 15 illustrates a second example of a method of manufacture.

FIG. 15 illustrates an alternative method comprising the steps of forming a composite backing plate 200 from the composite backing plate pre-cursor, forming a friction pad 300 from the friction pad 300 pre-cursor, and bonding the composite backing plate 200 and friction pad 300 to form the brake pad unit 100.

Figure 16:
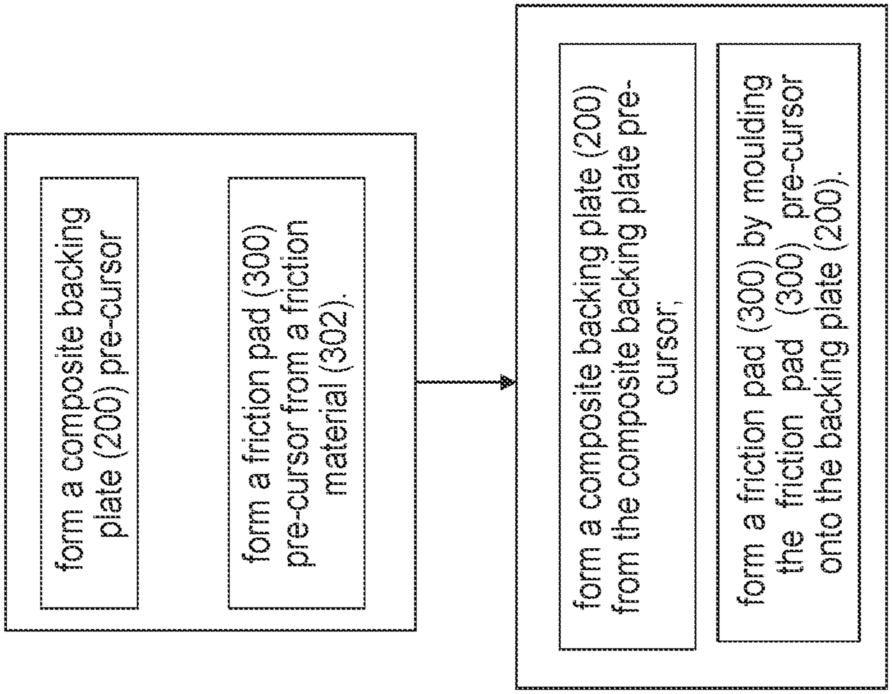
FIG. 16 illustrates a third example of a method of manufacture.

In some other examples, a method of manufacture of a brake pad unit 100 may comprise forming a composite backing plate 200 from the composite backing plate pre-cursor, and forming a friction pad 300 by moulding the friction pad 300 pre-cursor onto the backing plate 200. FIG. 16 illustrates another alternative method of manufacture of a brake pad unit 100, according to some such examples.

For example, the friction pad 300 may be formed by moulding the friction pad 300 pre-cursor onto the friction material mounting surface 210. In some examples, a layer of an adhesive may be added onto the friction material mounting surface 210 before the friction pad 300 pre-cursor is moulded onto the friction material mounting surface 210. The adhesive layer may enhance the bond between the backing plate 200 and the friction pad 300.

Any of the disclosed methods may further comprise a step of subjecting the arrangement to a post-curing heating profile involving being held at a first temperature. The post curing profile may comprise a schedule of repeatedly increasing the temperature and holding the condition at the higher temperature for a predetermined amount of time.

Hence the manufacturing process may comprise compression moulding of backing plate 200 pre-cursor layers of fibres and frictional material in a combination of one of the examples of the present disclosure in one operation (e.g. co-moulding), or two operations (e.g. where the backing plate and friction pad are formed separately and then bonded). The various layers of material are arranged in a suitable mould tool which is placed in a heated press with heated platens set at a temperature high enough to induce flow in the resin system being used. For example, using a phenolic resin as a binder this would be 120 to 180° C. whereas the PAEK family of resin binders would require a higher temperature up to 400° C. In such an example, using the PAEK family of resin binders, a separate moulding is used before adhering the backing plate 200 onto the friction pad 300.

Once heated thoroughly the loaded tool is compressed between heated platens with a suitable force (for example minimum 2 tons/square inch that equals 31 MPa) to provide adequate flow of the binder and compaction of the moulding. The moulded component may then be subjected to a post-curing heating profile involving being held at elevated temperature (for example minimum 3 hours at 150° C., but preferably 170° C.+ for 1 to 30 hours to improve heat stability. This post-curing cycle involves ramping up at various rates and then dwelling. The post-curing cycle may comprise controlled cooling.

Hence there is provided a brake pad unit 100 for a disc brake assembly with a configuration which means it may be produced to have a weight which is less, and stiffness which is at least as high as, examples of the related art.

Since the backing plate 200 is comprised of a composite material comprising reinforcement fibres and a binder throughout its structure (e.g. contains no metallic reinforcement material), a brake pad unit 100 according to the present disclosure is inherently less prone to corrosion related issues, and hence will have a longer operational life than examples of the related art which contain metallic reinforcement materials.

Thus a brake pad unit 100 having a configuration according to the present disclosure may, for the same or lesser weight, be more resistant to warping and have the same or higher rigidity than examples of the related art by virtue of utilising woven and/or continuous fibre composite reinforcement which extend the length and the width of the backing plate 200.

The additional step of post-curing/"baking" the materials during manufacturing of the brake pad unit 100 provides additional warp resistance and rigidity.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A brake pad unit for a disc brake assembly, the brake pad unit comprising a backing plate and a friction pad, wherein:
- the backing plate comprises:
  - a first side and a second side;
  - wherein the first side defines an engagement surface for engaging with the disc brake assembly;
  - the second side defines a friction material mounting surface; and
  - the backing plate is formed from a composite material comprising reinforcement fibres, wherein the composite material is present throughout an entirety of the backing plate; and
  - wherein the backing plate comprises:
    - a first layer of reinforcement fibres which are provided as continuous reinforcement fibres such that they extend from a first location on an edge wall of the backing plate to a second location on the edge wall; and
    - a second layer of reinforcement fibres which are provided as non-continuous reinforcement fibres in a randomly oriented fibre lay-up pattern,
  - and wherein the friction pad comprises a friction material provided on the friction material mounting surface of the backing plate.

2. The brake pad unit of claim 1, wherein all of the fibres in the first layer are aligned in a same direction.

3. The brake pad unit of claim 1, wherein at least some of the fibres in the first layer extend in a first direction and a remainder of the fibres in the first layer extend in a second direction, where the first direction is perpendicular to the second direction,
- wherein, optionally:
  - the backing plate has a length L, a width W, and a thickness T; and
  - the first direction is a length direction L, and the second direction is a width direction W.

4. The brake pad unit of claim 3, wherein the fibres (212) extending in the first direction and the fibres extending in the second direction are woven together.

5. The brake pad unit of claim 1, wherein at least some of the fibres in the first layer extend in a first direction and a remainder of the fibres in the first layer extend in a second direction, where the first direction is at an angle less than 90 degrees relative to the second direction.

6. The brake pad unit of claim 5, wherein the fibres extending in the first direction are provided in a first sub-layer and the fibres extending in the second direction are provided in a second sub-layer, wherein the first sub-layer and the second sub-layer are integrally formed.

7. The brake pad unit of claim 1, wherein
- the randomly orientated reinforcement fibres of the second layer have a length of at least 12 mm but not more than 50 mm.

8. The brake pad unit of claim 7, wherein a continuous reinforcement fibre layer defines the engagement surface and/or the friction material mounting surface; and the continuous reinforcement fibre layer is integrally formed with the or each other layers of the backing plate.

9. The brake pad unit of claim 1, wherein:

the composite material of the backing plate and the composite material of the friction material further comprises a binder material; and the binder material of the backing plate has molecular continuity with the binder material of the friction material to thereby form a bond between the backing plate and the friction material;

wherein, optionally:

the backing plate and friction material are co-moulded from an assembly of a backing plate pre-cursor and a friction pad pre-cursor.

10. The brake pad unit of claim 9, wherein the binder material comprises filled or unfilled phenolic novolac or resol type resins, epoxy, polyesters, polyimide, BMI and/or any of the PAEK family of thermoplastics.

11. The brake pad unit of claim 10, wherein the fibres are arranged such that a flexural modulus of the backing plate is at least 24 GPa and a flexural strength of the backing plate is at least 250 MPa.

12. The brake pad unit of claim 1, wherein:

the composite material of the backing plate further comprises a first binder material;

the composite material of the friction material further comprises a second binder material, the first binder material being different to the second binder material; and the friction material being bonded to the friction material mounting surface of the backing plate.

13. The brake pad unit of claim 1, wherein the reinforcement fibres comprise at least one of glass S-glass E-glass, carbon, aramid, other types of mineral fibre.

14. The brake pad unit of claim 1, wherein the fibres are arranged such that the backing plate has a compressive strength such that it is operable to deflect less than 0.7 mm at a load of 3000 N up to 250 degC.

15. The brake pad unit of claim 1, wherein the backing plate has a thickness of at least 2 mm but no more than 10 mm.

16. The brake pad unit of claim 1, wherein the first layer comprises:

a first set of the reinforcement fibres extending in a first direction;

a second set of the reinforcement fibres extending in a second direction different to the first direction; and one or more other sets of the reinforcement fibres extending in respective directions different to the first direction and the second direction.

17. A method of manufacture of a brake pad unit for a disc brake assembly comprising:

forming a composite backing plate pre-cursor formed from a composite material comprising reinforcement fibres, wherein the composite material is present throughout an entirety of the backing plate; and wherein the backing plate pre-cursor comprises:

a first layer of reinforcement fibres which are provided as continuous reinforcement fibres such that they extend from a first location on an edge wall of the composite backing plate to a second location on the edge wall; and a second layer of reinforcement fibres which are provided as non-continuous reinforcement fibres in a randomly oriented fibre lay-up pattern; and forming a friction pad pre-cursor from a friction material.

18. The method of manufacture of claim 17, further comprising the steps of:

co-moulding the pre-cursors to form the brake pad unit, wherein, optionally:

the method comprises the steps of:

arranging the pre-cursors in a mould tool;

locating the mould tool in a heated press set at a temperature high enough to induce flow in a binder;

compressing the arranged pre-cursors to provide flow of the binder and compaction of the moulding such that the pre-cursors are co-moulded; and subjecting the arrangement to a post-curing heating profile, wherein, optionally:

the post-curing heating profile comprises a schedule of repeatedly increasing the temperature and holding the condition at the higher temperature for a predetermined amount of time.

19. The method of manufacture of claim 17, further comprising the steps of:

forming a composite backing plate from the composite backing plate pre-cursor;

forming a friction pad from the friction pad pre-cursor; and bonding the composite backing plate and friction pad to form the brake pad unit.

20. The method of manufacture of claim 17, further comprising the steps of:

forming a composite backing plate from the composite backing plate pre-cursor; and forming a friction pad by moulding the friction pad pre-cursor onto the composite backing plate.

* * * * *